(12) United States Patent
Touzet et al.

(10) Patent No.: US 12,257,930 B2
(45) Date of Patent: Mar. 25, 2025

(54) RAIL SYSTEM FOR A VEHICLE SEAT

(71) Applicant: Faurecia Autositze GmbH, Hannover (DE)

(72) Inventors: Bertrand Touzet, Pollhagen (DE); Dan Stoia, Stadthagen (DE)

(73) Assignee: Faurecia Autositze GmbH, Hannover (DE)

( * ) Notice: Subject to any disclaimer, the term of this patent is extended or adjusted under 35 U.S.C. 154(b) by 373 days.

(21) Appl. No.: 17/731,537

(22) Filed: Apr. 28, 2022

(65) Prior Publication Data

US 2022/0348119 A1 Nov. 3, 2022

(30) Foreign Application Priority Data

Apr. 29, 2021 (DE) .................. 10 2021 111 061.0

(51) Int. Cl.
*B60N 2/07* (2006.01)
(52) U.S. Cl.
CPC .................................. *B60N 2/0705* (2013.01)
(58) Field of Classification Search
CPC ..... B60N 2/0705; B60N 2/067; B60N 2/0725
See application file for complete search history.

(56) References Cited

U.S. PATENT DOCUMENTS

| | | | |
|---|---|---|---|
| 7,350,853 B2 | 4/2008 | Fitze | |
| 10,144,310 B1 * | 12/2018 | Ferenc | B60N 2/07 |
| 11,077,790 B2 * | 8/2021 | Kominato | B60Q 3/53 |
| 11,433,785 B2 * | 9/2022 | Aktas | B60N 2/43 |
| 2004/0155168 A1 * | 8/2004 | Matsushiro | B60N 2/0725 248/424 |
| 2011/0139954 A1 * | 6/2011 | Ruess | B60N 2/067 248/429 |
| 2014/0123788 A1 * | 5/2014 | Geiges | F16H 25/08 74/89 |
| 2019/0308670 A1 * | 10/2019 | Schulz | B64C 1/18 |
| 2021/0046850 A1 * | 2/2021 | Yamada | B60N 2/0725 |
| 2022/0048409 A1 * | 2/2022 | Sprenger | B60N 2/067 |
| 2022/0161703 A1 * | 5/2022 | Jo | B62D 65/14 |
| 2023/0026058 A1 * | 1/2023 | Becker | B60N 2/067 |

(Continued)

FOREIGN PATENT DOCUMENTS

| | | | | |
|---|---|---|---|---|
| CA | 2505207 A1 * | 11/2005 | | B60N 2/0232 |
| CN | 203651508 U * | 6/2014 | | |
| CN | 112406640 A * | 2/2021 | | B60N 2/0705 |

(Continued)

*Primary Examiner* — Eret C McNichols
*Assistant Examiner* — Ding Y Tan
(74) *Attorney, Agent, or Firm* — Barnes & Thornburg LLP

(57) ABSTRACT

A rail system includes a lower rail and an upper rail guided therein where the upper rail is adjustable in relation to the lower rail via a longitudinal adjustment device, the longitudinal adjustment device comprising a threaded spindle attached inside the lower rail and a spindle nut screwed onto the threaded spindle which is firmly affixed to the upper rail via a transmission housing so that the upper rail can be displaced in the longitudinal direction by motorised actuation of the longitudinal adjustment device, the threaded spindle being covered, at least in certain regions, in the lower rail by a deformable protective element which comprises longitudinal edges extending in the longitudinal direction.

9 Claims, 3 Drawing Sheets

(56) References Cited

U.S. PATENT DOCUMENTS

| | | | |
|---|---|---|---|
| 2023/0062040 A1* | 3/2023 | Kuzmz | ................ B60N 2/4249 |
| 2023/0256870 A1* | 8/2023 | Hu | ......................... B60N 2/073 |
| | | | 248/430 |

FOREIGN PATENT DOCUMENTS

| | | | | |
|---|---|---|---|---|
| DE | 4208948 A1 * | 9/1992 | | |
| DE | 4204523 A1 | 8/1993 | | |
| DE | 102012108982 A1 | 3/2014 | | |
| EP | 4253140 A1 * | 10/2023 | ........... | B60N 2/0725 |
| KR | 1020100120768 | 11/2010 | | |
| KR | 20190069705 * | 6/2019 | | |
| KR | 1020190069705 | 6/2019 | | |
| WO | 2019224998 A1 | 11/2019 | | |

* cited by examiner

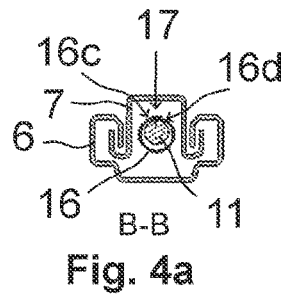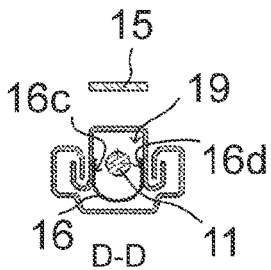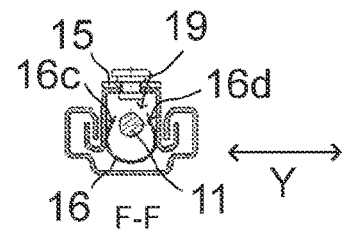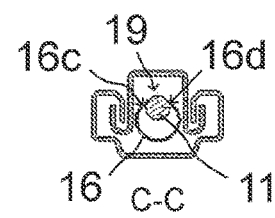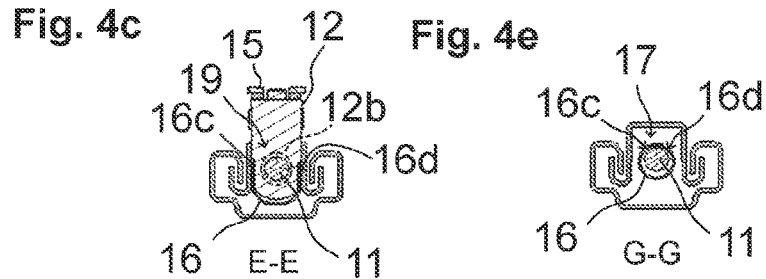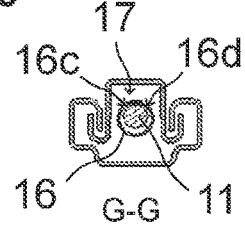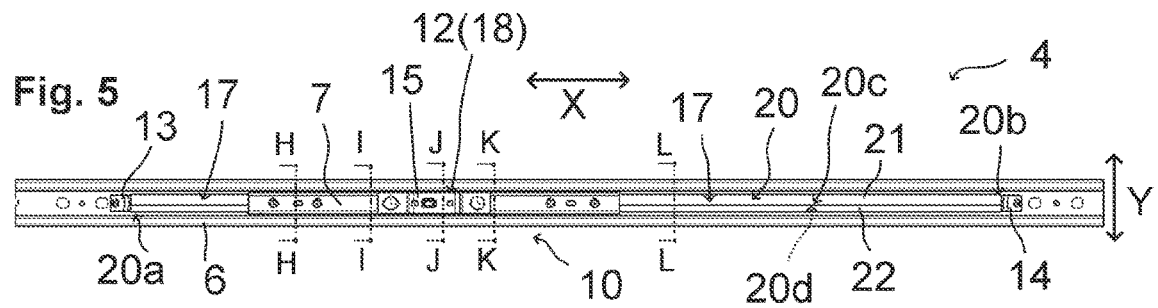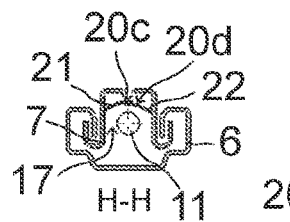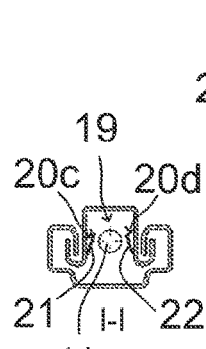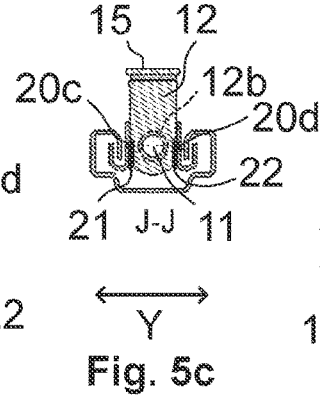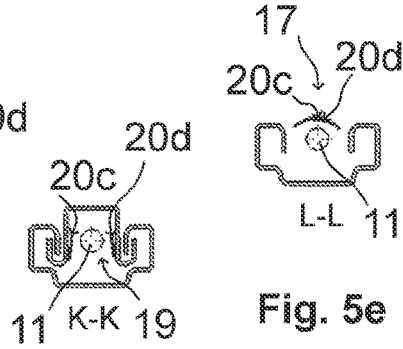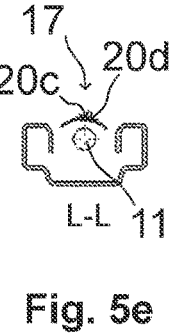

RAIL SYSTEM FOR A VEHICLE SEAT

PRIORITY CLAIM

This application claims priority to German Patent Application No. DE102021111061.0, filed Apr. 29, 2021, which is expressly incorporated by reference herein.

BACKGROUND

The present disclosure relates to a rail system for a vehicle seat, in particular a vehicle seat of a motor vehicle.

SUMMARY

According to the present disclosure, longitudinal edges of a protective element overlap in the transverse direction above a threaded spindle in at least one overlap region, i.e. lie planar on top of one another, such that the threaded spindle is covered at the top by the protective element in the at least one overlap region and the longitudinal edges are elastically deflected or capable of being elastically deformed in the transverse direction, i.e. towards the side or, respectively, perpendicular to the longitudinal direction, such that an opening is formed between the longitudinal edges above the threaded spindle and the transmission housing connected to the upper rail projects from that opening.

In illustrative embodiments, a simple and effective protection of the mechanical components of the rail system which can be motor driven is provided by virtue of an elastically deformable protective element which covers the threaded spindle at the top in its default shape, while at the same time enabling a simple option to connect the transmission housing to the upper rail. Owing to its overlap at the top the protective element is easy to mount in that it, for example, sheathed or positioned over the threaded spindle in its state open at the top and subsequently returns to its default shape by elastic recovery in which the longitudinal edges overlap or, respectively, lie planar on top of one another in the overlap region.

In illustrative embodiments, the longitudinal edges are kept open only in the region of the transmission housing. Preferably, on both sides this opening is joined by an overlap region covering the threaded spindle. Because in the region of the opening a cover is preferably provided by the upper rail it is sufficient for the threaded spindle to be covered by the protective element only in the overlap region.

In illustrative embodiments, such a protective element can be designed having lower weight, for example made from a fatigue resistant material, for example a plastic or metal, so as to allow for elastic recovery into the respective default shape after repeated elastic deformation. Hereby, also, a corrosion-free material may be utilised. Further, the present disclosure also provides a good optical quality perception.

In illustrative embodiments, a sleeve-like protective element, i.e. including a sleeve as default shape, may be provided as protective element which in the overlap region wraps fully around the threaded spindle in the manner of a sleeve, with longitudinal edges of the sleeve-like protective element overlapping transversely in the overlap region above the threaded spindle and are elastically deformed or deformable in the transverse direction so as to form the opening for the transmission housing above the threaded spindle. Thus, a secure montage of the protective element can be carried out in a simple manner thereby providing complete protection of the threaded spindle in the relevant areas.

Alternatively, a strip-shaped protective element may be provided as protective element which is formed by two partial strips extending in the longitudinal direction which lie side by side in the transverse direction and the longitudinal edges of which overlap in the overlap region above the threaded spindle in the transverse direction such that the threaded spindle is covered at the top by the partial strips, whereby the longitudinal edges are elastically deformed or deformable in the transverse direction so as to form the opening for the transmission housing above the threaded spindle. Thus, a covering of the threaded spindle at the top can be achieved in a simple manner with little expenditure in terms of material if the strip-shaped protective element made from the two partial strips, in particular in the overlap region, does not fully surround the threaded spindle. Hereby, already, it is possible at least to prevent the relevant entry of dirt from above.

In illustrative embodiments, the protective elements at their end rest against and/or be attached to supports of the threaded spindle so as to prevent displacement of the protective elements in the longitudinal direction. In order to prevent, upon longitudinal adjustment of the upper rail or the transmission housing respectively, undesired displacement of the protective element and thereby the threaded rod being unprotected at the top, the longitudinal movement of the protective element is prevented by this (these) measure(s).

In illustrative embodiments, the longitudinal edges MAY be elastically deformable or elastically deformed in the transverse direction by means of a guide element which can be adjusted in the longitudinal direction. In using this, the region around the transmission housing can be purposefully opened in a simple manner upon longitudinal adjustment of the upper rail. Hereby, it is provided that the guide element is or can be formed by the transmission housing itself. Thus, depending on the embodiment and the application, the transmission housing may itself provide for an opening of the protective element at the top that a simple construction is achieved.

In illustrative embodiments, the longitudinal edges elastically deform in the transverse direction to be arranged in the region of the transmission housing between the upper rail and the transmission housing. This leads to a secure guidance of the protective element without requiring additional components.

In illustrative embodiments, the longitudinal edges start from the transmission housing, as the distance from the transmission housing increases, continuously approach one another in the formed opening until they overlap in the transverse direction in the overlap region. This provides a continuous transition between the and the overlap region, with the transition depending, in particular, upon the elasticity of the chosen material and possibly the type of guide element so that the transition can be purposefully adapted.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 4a-4f are a series of sectional views of the rail system according to FIG. 4;

FIG. 5 is a top view on a rail system according to a further embodiment; and

FIGS. 5a-5e are a series of sectional views of the rail system according to FIG. 5.

DETAILED DESCRIPTION

Figure 1:
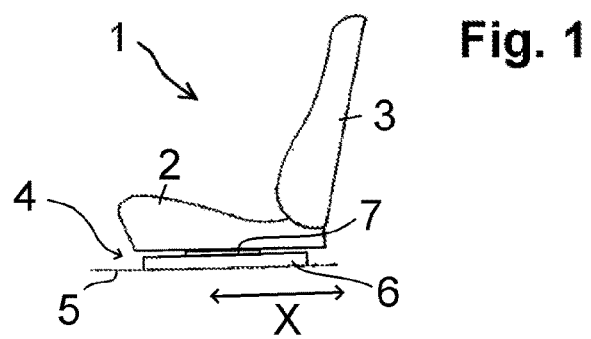
FIG. 1 is a schematic view of a vehicle seat.
Figure 2:
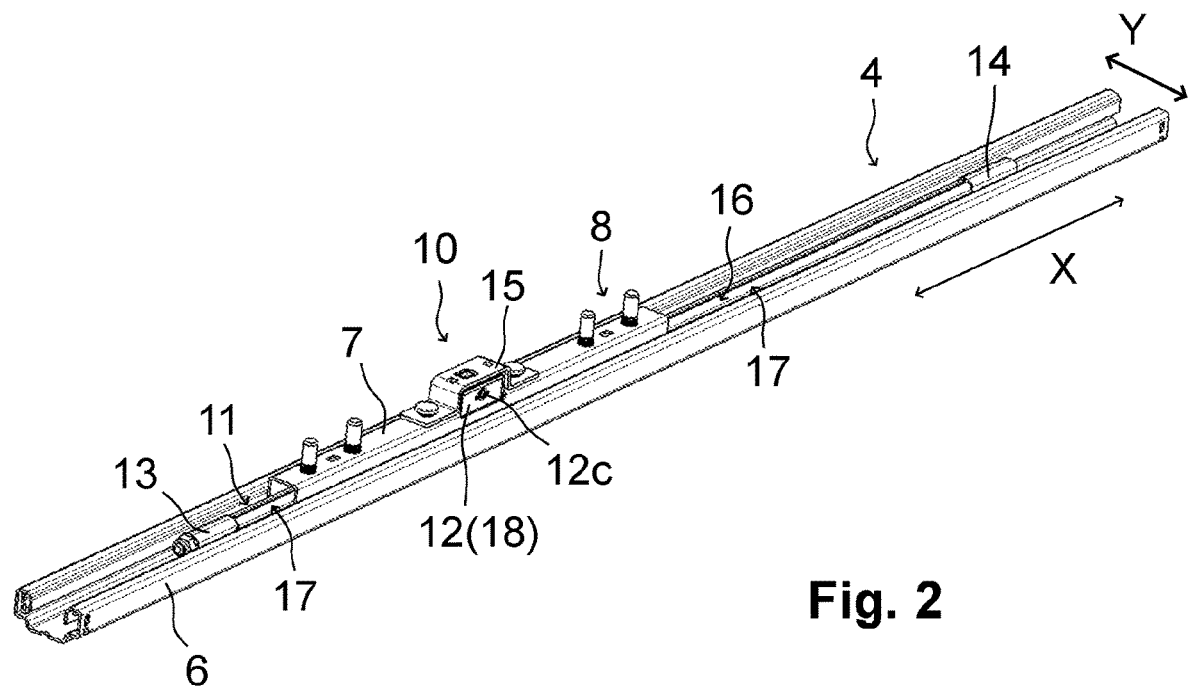
FIG. 2 is a detailed view of a rail system of the vehicle seat according to FIG. 1.

According to FIG. 1, a vehicle seat 1 for a motor vehicle comprises a seat portion 2 and a back rest 3 auf, whereby the vehicle seat 1 is connected on both to a floor 5 of the vehicle or an element firmly affixed to the floor via a support structure of the seat portion 2 on two rail systems 4 arranged in parallel to one another and extending in the longitudinal direction X. According to the detailed view in FIG. 2, the rail systems 4 each comprise a lower rail 6 firmly affixed to the floor and an upper rail 7 guided in the lower rail 6 such that it can be longitudinally displaced, whereby the support structure of the seat portion 2 is attached via corresponding attachment means 8 on the upper rail 7 so as to enable longitudinal adjustment of the vehicle seat 1.

Hereby, the longitudinal adjustment is carried out via a longitudinal adjustment device 10 which comprises a threaded spindle 11 extending in the longitudinal direction X and a transmission housing 12 in which a 12a including a spindle nut 12b is disposed. The threaded spindle 11 firmly affixed to the lower rail 6 within the lower rail 6 via supports 13, 14 at the ends. The transmission housing 12 including the transmission 12a is connected firmly to the upper rail 7 via a receptacle area 15. The transmission 12a comprises a drive interface 12c via which the transmission 12a can be coupled with a drive or a motor respectively (not shown) whereby the spindle nut 12b can be rotated. The spindle nut 12b is screwed onto the threaded spindle 11 so that motorised actuation of the longitudinal adjustment device 10 causes, via the transmission 12a, the upper rail 7 to be adjusted linearly in the longitudinal direction X in relation to the lower rail 8.

Figure 3:
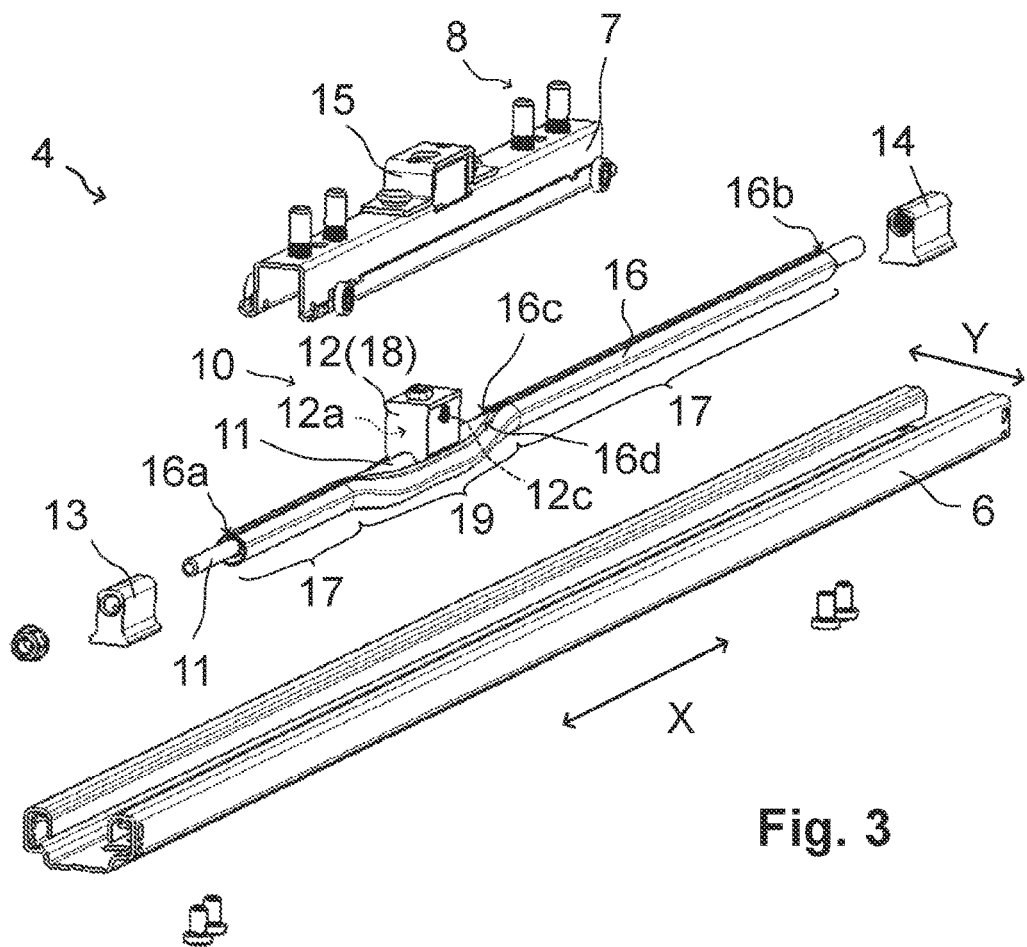
FIG. 3 shows the rail system according to FIG. 2 in a dismantled state according to an embodiment.

According to FIG. 3, further, a sleeve-like protective element 16 is arranged between the front and the rear support 13, 14 which in the embodiment shown surrounds the threaded spindle 11 at least in certain regions, thereby protecting the threaded spindle 11 against dirt, e.g. dust, sand or smaller objects. Hereby, the sleeve-like protective element 16 is arranged between the supports 13, 14 such that displacement of the sleeve-like protective element 16 in the longitudinal direction X in relation to the threaded spindle 11 is prevented. This can be achieved, for example, in that ends 16a, 16b of the sleeve-like protective element 16 each rest against the supports 13, 14 "up to contact." This prevents the sleeve-like protective element 16 surrounding the threaded spindle 11 from being displaced either beyond the front or beyond the rear support 13, 14. In addition, the ends 16a, 16b of the sleeve-like protective element 16 may also be suitable affixed to the supports 13, 14.

In the embodiment shown in FIG. 3, the sleeve-like protective element 16 can be opened at the top so as to make way for the transmission housing 12 in the case of motorised longitudinal adjustment. To that end, the sleeve-like protective element 16 has as its default shape the shape of a sleeve which is closed at the top, i.e. towards the upper rail 7, in an overlap region 17 by longitudinal edges 16c, 16d overlapping perpendicular to the longitudinal direction X or, respectively, in the transverse direction Y thereby covering the threaded spindle 11. By means of any desired guide element 18 it is possible to elastically deform the longitudinal edges 16c, 16d sideways, i.e. in the transverse direction Y, such that the overlap no longer thereby forming an opening 19 in the sleeve-like protective element 16 in the region around the guide element 18 through which the transmission housing 12 can project out of the sleeve-like protective element 16 into the receiving region 15.

When the guide element 18 is displaced in the longitudinal direction X the opening 19 also shifts in the longitudinal direction X, whereby the longitudinal edges 16c, 16d overlapping in the transverse direction Y are opened prior to the guide element 18 in the direction of movement and, owing to the elasticity of the material of the sleeve-like protective element 16, also closed again or, respectively start overlapping again behind the guide element 18 in the direction of movement. Thus, the sleeve-like protective element 16 is pushed away to the side or, respectively, in the transverse direction Y by the guide element 18 in the region of the transmission housing 12 so that in this area the threaded spindle 11 is no longer covered by the sleeve-like protective element 16, however, covered by the upper rail 7 instead, as can be seen, in particular, in FIG. 2 or FIG. 3.

In order to enable such an elastic deformation of the longitudinal edges 16c, 16d or, respectively, the sleeve-like protective element 16 in the transverse direction Y on a permanent basis, the sleeve-like protective element 16 is made from a fatigue resistant material providing reversion into the default shape (sleeve shape) even following repeated elastic deformation. The chosen material may be, for example, metal or plastic. Depending on the elasticity of the material an opening 19 is then formed by "displacement" in the longitudinal direction X in front of and behind the guide element 18 for the transmission housing 12 correspondingly extending in the transverse direction Y and longitudinal direction X.

In the embodiment example of FIG. 3 the guide element 18 is formed by the transmission housing 12 itself which provides that the longitudinal edges 16c, 16d in longitudinal direction X are elastically deformed sideways in front of and behind the transmission housing 12 so that a corresponding opening 19 is formed around the transmission housing 12. Alternatively, other components may be provided as guide elements 18 in front of and behind the transmission housing 12 which provides that the longitudinal edges 16c, 16d in the transverse direction Y are elastically deformed.

Figure 4:
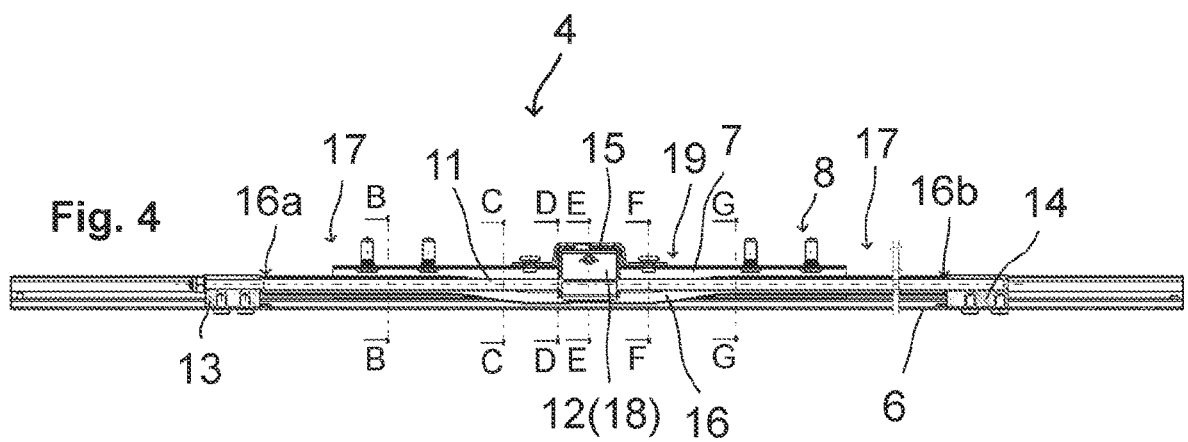
FIG. 4 shows the rail system according to FIG. 3 in a side view.

The deformation of the longitudinal edges 16c, 16d by the transmission housing 12 is shown by way of example in different sectional views in the FIGS. 4a through 4f, which correspond to the cutting lines B-B-through G-G depicted in FIG. 4. Thus, the protective element 16 in FIG. 4a (B-B) still exhibits the default shape or sleeve shape respectively in which the protective element 16 wraps completely around the threaded spindle 11 thereby covering it at the top. In FIG. 4b (C-C) and FIG. 4c (D-D) the sleeve-like protective element 16 is already open at the top and the threaded spindle 11 partially exposed without the transmission housing 12 as guide element 18 being in immediate contact with the longitudinal edges 16c, 16d in this region. Hereby, the longitudinal edges 16c, 16d become more and more undone in the transverse direction Y as the distance to the transmission housing 12 decreases.

It is not until in FIG. 4d (E-E) that the transmission housing 12 rests against the longitudinal edges 16c, 16d directly pressing them outwards in the transverse direction Y. Hereby, the longitudinal edges 16c, 16d extend between the transmission housing 12 and the upper rail 7 at opposing sides of the transmission housing 12. In the FIG. 4e (F-F) and FIG. 4f (G-G) elastic recovery presses the longitudinal edges 16c, 16d back into the default shape, with the longitudinal edges 16c, 16d approaching one another more and more as the distance from the transmission housing 12 increases (in the transverse direction Y) and in FIG. 4f again forming an overlap (in the transverse direction Y) in the default shape/sleeve shape so that the threaded spindle 11 is covered again at the top. This results in a substantially symmetrical deformation of the longitudinal edges 16c, 16d before and behind the transmission housing 12, assuming a homogeneous material is used.

According to FIG. 5, an alternative embodiment example is provided, wherein no sleeve-like protective element 16 is provided but, rather, a strip-shaped protective element 20 consisting of two partial strips 21, 22 lying side by side in the transverse direction Y. Hereby, the same functionality can be attained as in the previous embodiment, namely protecting the threaded spindle 11 against dirt, because the partial strips 21, 22 cover the threaded spindle 11 at least in overlap regions 17. Hereby, too, the strip-shaped protective element 20 is arranged with its ends 20a, 20b between the end point supports 13, 14 of the threaded spindle 11, whereby the movement of the strip-shaped protective element 20 in the longitudinal direction X is limited by the supports 13, 14. This can be ascertained by an additional end point attachment of the strip-shaped protective element 20 to the supports 13, 14.

In this embodiment example, too, longitudinal edges 20c, 20d of the strip-shaped protective element 20, which are formed by the respectively interior edges of the two partial strips 21, 22 extending in the longitudinal direction X, may be displaced or, respectively, elastically deformed by a guide element 18 from their default position towards the side or, respectively, in the transverse direction Y so as to form an opening 19 for the transmission housing 12. In front of and behind the opening 19 the two partial strips 21, 22 overlap in the transverse direction Y along the longitudinal edges 20c, 20d in an overlap region 17 so that the threaded spindle 11 is protected against dirt. Here, too, the longitudinal edges 20c, 20d continuously approach one another starting from the transmission housing 12 towards both sides as the distance from the transmission housing 12 increases until they overlap again in the transverse direction Y in the overlap regions 17.

By virtue of the elastic deformation of the longitudinal edges 20c, 20d in the transverse direction Y, which happens according to the sectional views in the FIGS. 5a through 5e in a manner similar to the manner depicted in the FIGS. 4a through 4f, it is also possible to enable a longitudinal adjustability of the transmission housing 12. Hereby, in contrast to the previous embodiment, the partial strips 21, 22 of the strip-shaped protective element 20 do not wrap around the underside of the threaded spindle 11 which, however, is not absolutely necessary given the construction of the rail system 4 because dirt mainly enters from above.

Rail systems for vehicle seats may comprise a lower rail to be attached firmly to the floor or chassis respectively and an upper rail received in the lower rail such that it can be longitudinally adjusted. Motorised rail systems further include a threaded spindle onto which a spindle nut is screwed, the threaded spindle, for example, being firmly affixed to the lower rail and the spindle nut being arranged in a transmission housing firmly affixed to the upper rail. Hereby, the upper rail can be longitudinally displaced by motorised rotation of the spindle nut on the threaded spindle, upon which rail the vehicle seat or a seat structure of the vehicle seat respectively is arranged. In order to attain a durable functionality of such a motorised longitudinal adjustment mechanism it is to be ascertained that no dirt gets into the mechanical components, whereby the transmission is secure already by the transmission housing.

In one comparative design, protection of the lower rail against dirt entering may occur by means of a strip shaped protective element extending between two longitudinal guides on the immobile lower rail affixed to the floor. The end of the strip shaped protective element is attached to the mobile upper rail and is carried along by the mobile upper rail upon longitudinal displacement in such a manner that the slot in the lower rail affixed to the floor is successively covered by the strip shaped protective element.

In another comparative design, covering a longitudinal adjustment device formed by a threaded spindle and a spindle nut by means of a caterpillar-like protective element which is designed as a continuous band. Hereby, the continuous band is guided, starting from one end of the mobile upper rail, along the upper side towards one of the ends of the lower rail affixed to the floor, deflected downwards and guided back along the underside towards the other end of the lower rail. Starting from there, the continuous band is deflected again upwards and guided towards the other end of the upper rail. When the upper rail is longitudinally adjusted the continuous band guided in the lower rail is carried along whereby complete covering of the lower rail is attained for each longitudinal position.

In another comparative design, a laterally guided planar protective element covering the lower rail and being attached to the end of the upper rail and on the other side being coiled onto a cylinder. Thus, when the upper rail is longitudinally adjusted the protective element is able to move along with the upper rail and maintain the cover of the lower rail.

In another comparative design, a zipper system the slider of which is connected to the upper rail. The slider acts in such a way that the zipper is closed in front of as well as behind the slider so that the zipper opens only in the region where the upper rail is located. This allows the lower rail to be covered in the region next to the upper rail.

The present disclosure is based on the object of designing a rail system which can be motor driven allowing for a simple and reliable protection of the mechanical components against dirt. This task is solved by a rail system according to the present disclosure.

Thus, according to the present disclosure, it is provided that longitudinal edges of a protective element overlap in the transverse direction above a threaded spindle in at least one overlap region, i.e. lie planar on top of one another, such that the threaded spindle is covered at the top by the protective element in the at least one overlap region and the longitudinal edges are elastically deflected or capable of being elastically deformed in the transverse direction, i.e. towards the side or, respectively, perpendicular to the longitudinal direction, such that an opening is formed between the longitudinal edges above the threaded spindle and the transmission housing connected to the upper rail projects from that opening.

Thus, advantageously, a simple and effective protection of the mechanical components of the rail system which can be motor driven is provided by virtue of an elastically deformable protective element which covers the threaded spindle at the top in its default shape, while at the same time enabling a simple option to connect the transmission housing to the upper rail. Owing to its overlap at the top the protective element is easy to mount in that it, for example, sheathed or positioned over the threaded spindle in its state open at the top and subsequently returns to its default shape by elastic recovery in which the longitudinal edges overlap or, respectively, lie planar on top of one another in the overlap region.

The longitudinal edges are kept open only in the region of the transmission housing. Preferably, on both sides this opening is joined by an overlap region covering the threaded spindle. Because in the region of the opening a cover is preferably provided by the upper rail it is sufficient for the threaded spindle to be covered by the protective element only in the overlap region.

Moreover, such a protective element can be designed having lower weight, for example made from a fatigue resistant material, for example a plastic or metal, so as to allow for elastic recovery into the respective default shape after repeated elastic deformation. Hereby, also, a corrosion-free material may be utilised. Further, the present disclosure also provides a good optical quality perception.

Preferably, a sleeve-like protective element, i.e. including a sleeve as default shape, may be provided as protective element which in the overlap region wraps fully around the threaded spindle in the manner of a sleeve, with longitudinal edges of the sleeve-like protective element overlapping transversely in the overlap region above the threaded spindle and are elastically deformed or deformable in the transverse direction so as to form the opening for the transmission housing above the threaded spindle. Thus, a secure montage of the protective element can be carried out in a simple manner thereby providing complete protection of the threaded spindle in the relevant areas.

Alternatively, a strip-shaped protective element may be provided as protective element which is formed by two partial strips extending in the longitudinal direction which lie side by side in the transverse direction and the longitudinal edges of which overlap in the overlap region above the threaded spindle in the transverse direction such that the threaded spindle is covered at the top by the partial strips, whereby the longitudinal edges are elastically deformed or deformable in the transverse direction so as to form the opening for the transmission housing above the threaded spindle. Thus, a covering of the threaded spindle at the top can be achieved in a simple manner with little expenditure in terms of material if the strip-shaped protective element made from the two partial strips, in particular in the overlap region, does not fully surround the threaded spindle. Hereby, already, it is possible at least to prevent the relevant entry of dirt from above.

Preferably, it is further provided to have the protective elements at their end rest against and/or be attached to supports of the threaded spindle so as to prevent displacement of the protective elements in the longitudinal direction. In order to prevent, upon longitudinal adjustment of the upper rail or the transmission housing respectively, undesired displacement of the protective element and thereby the threaded rod being unprotected at the top, the longitudinal movement of the protective element is prevented by this (these) measure(s).

According to the present disclosure, it is further provided for the longitudinal edges to be elastically deformable or elastically deformed in the transverse direction by means of a guide element which can be adjusted in the longitudinal direction. In using this, the region around the transmission housing can be purposefully opened in a simple manner upon longitudinal adjustment of the upper rail. Hereby, it is provided that the guide element is or can be formed by the transmission housing itself. Thus, depending on the embodiment and the application, the transmission housing may itself provide for an opening of the protective element at the top that a simple construction is achieved.

Preferably, it is further provided for the longitudinal edges elastically deformed in the transverse direction to be arranged in the region of the transmission housing between the upper rail and the transmission housing. This leads to a secure guidance of the protective element without requiring additional components.

Preferably, it is further provided for the longitudinal edges starting from the transmission housing, as the distance from the transmission housing increases, continuously approach one another in the formed opening until they overlap in the transverse direction in the overlap region. This provides a continuous transition between the and the overlap region, with the transition depending, in particular, upon the elasticity of the chosen material and possibly the type of guide element so that the transition can be purposefully adapted.

The present disclosure relates to a rail system 4 including a lower rail 6 and an upper rail 7 guided therein where the upper rail 7 is adjustable in relation to the lower rail 6 via a longitudinal adjustment device 10, the longitudinal adjustment device 10 comprising a threaded spindle 11 attached inside the lower rail 6 and a spindle nut 12*b* screwed onto the threaded spindle 11 which is firmly affixed to the upper rail 7 via a transmission housing 12 so that the upper rail 7 can be displaced in the longitudinal direction X by motorised actuation of the longitudinal adjustment device 10, the threaded spindle 11 being covered, at least in certain regions, in the lower rail 6 by a deformable protective element 16 which comprises longitudinal edges 16*c*, 16*d* extending in the longitudinal direction X.

The present disclosure provides that the longitudinal edges 16*c*, 16*d* overlap above the threaded spindle 11 in an overlap region 17 in the transverse direction Y such that the threaded spindle 11 in the at least one overlap region 17 is covered at the top by the protective element 16, and the longitudinal edges 16*c*, 16*d* are elastically deformable in the transverse direction Y so that an opening 19 can be formed between the longitudinal edges 16*c*, 16*d* above the threaded spindle 11 from which the transmission housing 12 connected to the upper rail 7 projects, and the longitudinal edges 16*c*, 16*d*; 20*c*, 20*d* being elastically deformable or elastically deformed in the transverse direction Y by a guide element 18 adjustable in the longitudinal direction X, the guide element 18 being formed by the transmission housing 12.

The invention claimed is:

1. A rail system for a vehicle seat includes
a lower rail for connecting to a floor of a vehicle and an upper rail guided in the lower rail for connecting to a seating portion of the vehicle seat, where the upper rail is adjustable in a longitudinal direction in relation to the lower rail via a longitudinal adjustment device, the longitudinal adjustment device comprising a threaded spindle attached inside the lower rail and a spindle nut screwed onto the threaded spindle which is firmly affixed to the upper rail via a transmission housing so that the upper rail is displaced in the longitudinal direction by motorised actuation of the longitudinal adjustment device guided by the lower rail, the threaded spindle being covered, at least in certain regions, in the lower rail by a deformable protective element extending in the longitudinal direction, the protective element comprising longitudinal edges extending in the longitudinal direction, wherein the longitudinal edges overlap in the transverse direction above the threaded spindle to form at least one overlap region extending along a length of the spindle in the longitudinal direction, such that the threaded spindle in the at least one overlap region is covered at the top by the protective element, and the longitudinal edges are elastically deformable in the transverse direction so that an opening is formed adjacent to the at least one overlap region by a guide element, the opening formed between the longitudinal edges above the threaded spindle from which the transmission housing connected to the upper rail projects, and the longitudinal edges being elastically deformable or elastically deformed in the transverse direction by the guide element, the guide element adjustable in the longitudinal direction to change a longitudinal location of the opening and the at least one overlap region, the guide element being formed by the transmission housing.

2. The rail system of claim 1, wherein as protective element a sleeve protective element is provided which completely wraps around a circumference of the threaded spindle along a longitudinal length of the at least one overlap region, where longitudinal edges of the sleeve protective element overlap in the transverse direction along the overlap region above the threaded spindle and are elastically deformed in the transverse direction so as to form the opening above the threaded spindle.

3. The rail system of claim 1, wherein as protective element a strip-shaped protective element is provided which is formed by two partial strips extending in the longitudinal direction lying side by side in the transverse direction and the longitudinal edges of which overlap in the transverse direction along a longitudinal length of the overlap region above the threaded spindle, the threaded spindle being covered at the top by the partial strips, the longitudinal edges being elastically deformable in the transverse direction so as to form the opening above the threaded spindle, whereby, preferably, the strip-shaped protective element made from the two partial strips is not wrapped completely around the threaded spindle in the overlap region.

4. The rail system of claim 1, wherein, the threaded spindle is covered at the top in the region of the opening by the upper rail.

5. The rail system of claim 1, wherein the protective elements at their ends rest against and/or be attached to supports of the threaded spindle so as to prevent displacement of the protective elements in the longitudinal direction.

6. The rail system of claim 1, wherein the longitudinal edges elastically deformable in the transverse direction are arranged in the region of the transmission housing between the upper rail and the transmission housing.

7. The rail system of claim 1, wherein the longitudinal edges, starting from the transmission housing, as the distance from the transmission housing increases, continuously approach one another in the formed opening until they overlap in the transverse direction in the overlap region.

8. The rail system of claim 1, wherein the protective element is made from a fatigue resistant material, for example a plastic or metal, so as to allow for elastic recovery into the respective default shape after repeated elastic deformation.

9. A rail system for a vehicle seat includes
 a lower rail for connecting to a floor of a vehicle and an upper rail guided in the lower rail for connecting to a seating portion of the vehicle seat, where the upper rail is adjustable in a longitudinal direction in relation to the lower rail via a longitudinal adjustment device, the longitudinal adjustment device comprising a threaded spindle attached inside the lower rail and a spindle nut screwed onto the threaded spindle which is firmly affixed to the upper rail via a transmission housing so that the upper rail is displaced in the longitudinal direction by motorised actuation of the longitudinal adjustment device guided by the lower rail, the threaded spindle being covered, at least in certain regions, in the lower rail by a deformable protective element extending in the longitudinal direction, the protective element comprising longitudinal edges extending in the longitudinal direction,
 wherein the longitudinal edges overlap in the transverse direction above the threaded spindle in at least one overlap region, the at least one overlap region extending longitudinally along a length of the spindle, such that the threaded spindle in the at least one overlap region is covered at the top by the protective element, and the longitudinal edges are elastically deformable in the transverse direction so that an opening is formed adjacent to the at least one overlap region by a guide element, the opening formed between the longitudinal edges above the threaded spindle from which the transmission housing connected to the upper rail projects, and the longitudinal edges being elastically deformable or elastically deformed in the transverse direction by the guide element, the guide element adjustable in the longitudinal direction to change a longitudinal location of the opening and the at least one overlap region, the guide element being formed by the transmission housing,
 wherein the protective element is at least partially extending between the spindle and the upper rail.

\* \* \* \* \*